United States Patent
Kou et al.

(10) Patent No.: US 7,957,479 B2
(45) Date of Patent: Jun. 7, 2011

(54) APPARATUS AND METHOD FOR SUPPORTING DISTORTIONLESS VECTOR PERTURBATION IN MULTIPLE ANTENNA SYSTEM

(75) Inventors: Yajun Kou, Suwon-si (KR); Joo-Hyun Lee, Suwon-si (KR); Sang-Boh Yun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 628 days.

(21) Appl. No.: 12/099,758

(22) Filed: Apr. 8, 2008

(65) Prior Publication Data
US 2008/0247489 A1    Oct. 9, 2008

(30) Foreign Application Priority Data

Apr. 9, 2007    (KR) .................. 10-2007-0034507

(51) Int. Cl.
*H04K 1/10*        (2006.01)
*H04L 27/28*       (2006.01)
(52) U.S. Cl. ........ 375/260; 375/296; 375/261; 375/279; 375/298; 375/308; 455/450; 455/562.1
(58) Field of Classification Search .................. 375/260, 375/261, 279, 296, 298, 308, 220; 455/450, 455/562.1
See application file for complete search history.

(56) References Cited

U.S. PATENT DOCUMENTS

| | | | |
|---|---|---|---|
| 7,317,764 B2 * | 1/2008 | Hochwald et al. | 375/296 |
| 2003/0215006 A1 * | 11/2003 | Raghothaman | 375/220 |
| 2004/0253986 A1 * | 12/2004 | Hochwald et al. | 455/562.1 |
| 2005/0043031 A1 * | 2/2005 | Cho et al. | 455/450 |
| 2005/0195769 A1 * | 9/2005 | Kaewell et al. | 370/335 |
| 2006/0251175 A1 * | 11/2006 | Reznik et al. | 375/240.24 |

FOREIGN PATENT DOCUMENTS
KR    10-2007-0038150 A    4/2007

* cited by examiner

*Primary Examiner* — Phuong Phu
(74) *Attorney, Agent, or Firm* — Jefferson IP Law, LLP (57) ABSTRACT

An apparatus and method for supporting distortionless vector perturbation in a Multi-Input Multi-Output (MIMO) system are provided. The apparatus includes a transmitter for supporting distortionless vector perturbation in a MIMO system. The transmitter includes a label inserter for generating a label and for inserting the label into a user information bit, a scrambler for scrambling the user information bit inserted with the label and for generating N independent candidate sequences, a modulator for modulating the N independent candidate sequences according to a modulation scheme and a vector perturbation unit for adding a limited offset vector so that the modulated symbols are mapped to a constellation point in a feasible region. The apparatus and method provide vector perturbation with improved performance and reduced computational complexity.

18 Claims, 5 Drawing Sheets

APPARATUS AND METHOD FOR SUPPORTING DISTORTIONLESS VECTOR PERTURBATION IN MULTIPLE ANTENNA SYSTEM

PRIORITY

This application claims the benefit under 35 U.S.C. §119(a) to a Korean patent application filed in the Korean Intellectual Property Office on Apr. 9, 2007 and assigned Serial No. 2007-34507, the entire disclosure of which is hereby incorporated by reference.

BACKGROUND OF THE INVENTION

1. Field of the Invention

The present invention relates to an apparatus and method for supporting distortionless vector perturbation in a Multiple-Input Multiple-Output (MIMO) system. More particularly, the present invention relates to an apparatus and method in which a symbol having a maximum Signal to Noise Ratio (SNR) is transmitted by generating a plurality of labels and candidate sequences for one input signal and then generating independent symbols by adding a limited offset vector.

2. Description of the Related Art

Recently, the use of a Multiple-Input Multiple-Output (MIMO) technique in a mobile communication system has expanded, particularly because the MIMO technique supports a high data rate. In addition to a point-to-point MIMO technique, there is active research on a multiple-user MIMO technique in which a Base Station (BS) transmits data to a plurality of Mobile Stations (MSs) corresponding to multiple users. Unlike the point-to-point MIMO technique, in a multi-user environment, data is transmitted simultaneously to the multiple users in order to increase transmission efficiency. In such a case, when the number of Transmit (Tx) antennas is greater than the number of Receive (Rx) antennas, a multiplexing efficiency can be maximized only when data is simultaneously transmitted to the multiple users. One problem which may occur in this case is that a signal of one user may act as interference to another user.

A method of canceling an interference signal may be classified into an interference cancellation method of a transmitting end and an interference cancellation method of a receiving end according to the location where the interference signal is cancelled. When the number of Tx antennas is one, interference is canceled at the receiving end. That is, a method in which a signal of another user is decoded and is then cancelled in the receiving end is provided as an optimal method without having to use an interference cancellation method of the transmitting end. On the other hand, when the number of antennas of the transmitting end is greater than one, it is not optimal to cancel interference in the receiving end. Thus, an interference cancellation method of the transmitting end is performed. If interference cancellation is performed at the transmitting end, Dirty Paper Coding (DPC), which supports a maximum data rate, has been shown to provide good performance. An example of DPC is a vector perturbation method. The vector perturbation method is a pre-coding technique for a broadcasting channel of a Gaussian MIMO system and has recently been emerged as an important research topic. The vector perturbation method is considered a promising technique because it has a desirable computational complexity and provides almost all the capacity of the broadcasting channel.

In the vector perturbation method, a Signal-to-Interference plus Noise Ratio (SINR) is maximized by using an integer offset vector. An optimal offset vector is obtained by solving an integer programming problem which restricts all variables to have only integer values. Because an Rx signal is affected by vector perturbation, the vector perturbation is removed by a receiver which performs a modulo operation and thus prevents distortion from being added to the signal.

There is another vector perturbation method in which an integer offset vector and a continuous offset vector are used together to reduce a total Mean Squared Error (MSE). The introduction of the continuous offset vector results in a decrease in the MSE. However, unlike the integer offset vector, the continuous offset vector causes distortion in the receiver. Accordingly, the offset vector may be optimized by balancing between the decrease in the MSE and an amount of distortion. The optimal offset vector is determined in two steps. First, the integer offset vector is obtained by solving the integer programming problem. Second, the continuous offset vector is obtained to have a format similar to the integer offset vector obtained by solving the integer programming problem. However, in either the case of using only the integer offset vector or the case of using both the integer offset vector and the continuous offset vector, the integer programming problem must be solved, which leads to a computational complexity.

Accordingly, there is a need for an apparatus and method for supporting vector perturbation that is capable of providing improved performance, as compared to a conventional method of the vector perturbation, by reducing a computational complexity while increasing an SINR.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting distortionless vector perturbation in a Multiple-Input Multiple-Output (MIMO) system.

Another aspect of the present invention is to provide an apparatus and method for supporting distortionless vector perturbation for minimizing effective noise power by using a limited continuous offset vector in a MIMO system.

Yet another aspect of the present invention is to provide an apparatus and method for reducing a computational complexity of vector perturbation by solving a Quadratic Programming (QP) problem in a MIMO system.

According to an aspect of the present invention, a transmitter for supporting distortionless vector perturbation in a MIMO system is provided. The transmitter includes a label inserter for generating a label and for inserting the label into a user information bit, a scrambler for scrambling the user information bit inserted with the label and for generating N independent candidate sequences, a modulator for modulating the N independent candidate sequences according to a modulation scheme and a vector perturbation unit for adding a limited offset vector so that the modulated symbols are mapped to a constellation point in a feasible region.

According to another aspect of the present invention, a method of supporting distortionless vector perturbation in a MIMO system is provided. The method includes generating a label, inserting the label into a user information bit, scrambling the user information bit inserted with the label, generating N independent candidate sequences, modulating the N independent candidate sequences to output modulated symbols according to a modulation scheme and adding a limited offset vector so that the modulated symbols are mapped to a constellation point in a feasible region.

According to yet another aspect of the present invention, a receiver for supporting distortionless vector perturbation in a MIMO system is provided. The receiver includes a demodulator for detecting a received signal and for demodulating the received signal according to a demodulation scheme corresponding to a modulation scheme, a de-scrambler for performing an inverse operation of scrambling on the demodulated signal and a label remover for removing a label from a sequence output from the de-scrambler and for outputting a user information bit.

According to still another aspect of the present invention, a data receiving method for supporting distortionless vector perturbation in a MIMO system is provided. The method includes detecting a received signal, demodulating the received signal according to a demodulation scheme corresponding to a modulation scheme, performing an inverse operation of scrambling on the demodulated signal, removing a label from a sequence output by performing the inverse operation of scrambling and outputting a user information bit.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Also, the terms used herein are defined according to the functions of the present invention. Thus, the terms may vary depending on user or operator intension and usage. That is, the terms used herein must be understood based on the descriptions made herein.

Hereinafter, an exemplary apparatus and method for supporting distortionless vector perturbation in a Multiple-Input Multiple-Output (MIMO) system will be described.

Figure 1:
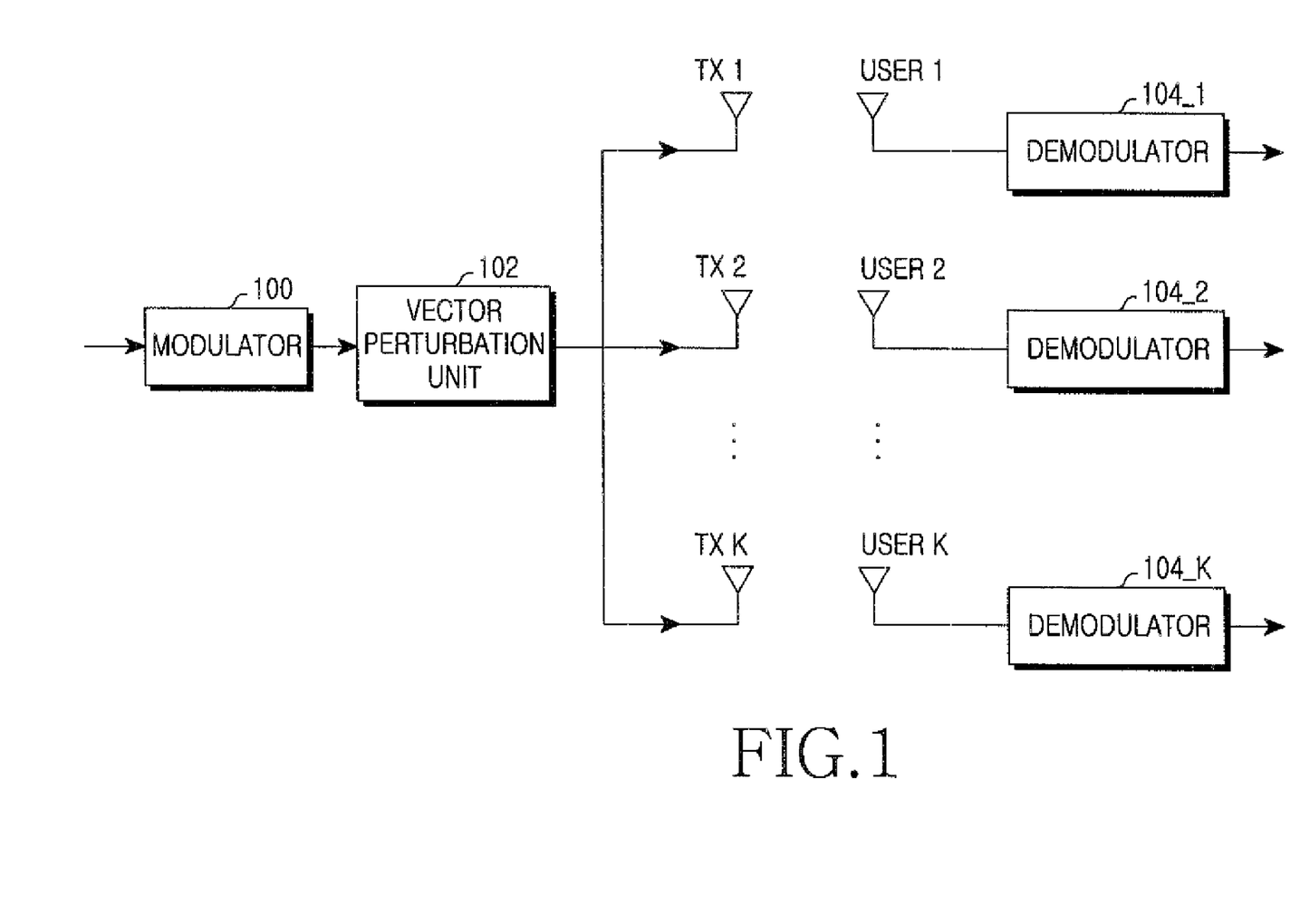
FIG. 1 is a block diagram illustrating a transmitter/receiver for performing vector perturbation in a Multi-Input Multi-Output (MIMO) system according to an exemplary embodiment of the present invention.

FIG. 1 is a block diagram illustrating a transmitting end and a receiving end for performing vector perturbation in a MIMO system according to an exemplary embodiment of the present invention.

Referring to FIG. 1, vector perturbation is performed in a MIMO system having K users User 1 to User K (i.e., Mobile Stations (MSs)) each having a single antenna and a Base Station (BS) having K Transmit (Tx) antennas Tx_1 to Tx_K.

The transmitting end includes a modulator 100 and a vector perturbation unit 102. The modulator 100 modulates a symbol by mapping an information bit to a constellation point according to a modulation scheme, and outputs the modulated symbol to the vector perturbation unit 102. The vector perturbation unit 102 performs pre-coding by adding an offset vector to the modulated symbol. The receiving end includes a plurality of demodulators 104_1 to 104_K respectively associated with each of User 1 to User K. Each demodulator demodulates a corresponding modulated symbol received from the transmitter by canceling interference, and thus outputs an information bit.

If K×1 Tx signal vectors and Receive (Rx) signal vectors are respectively indicated by x and y, and a channel matrix is indicated by H in the transmitter, then the Tx signal vector and the Rx signal vector are related as expressed by Equation (1) below.

$$y = Hx + n \qquad (1)$$

In Equation (1), y is an Rx signal, x is a Tx signal, H is a channel matrix, and n is Additive White Gaussian Noise (AWGN).

If a data vector and an offset vector are indicated by u and δ, respectively, the Tx signal vector x is expressed by Equation (2) below.

$$x = \frac{\sqrt{p}}{\sqrt{\gamma}} H^H (HH^H)^{-1}(u + \delta) \qquad (2)$$

In Equation (2), p is a Tx power, γ is a normalization factor, H is a channel matrix, u is a data vector, and δ is an offset vector. $(\cdot)^H$ is a Hermitian matrix, and $(\cdot)^{-1}$ is an inverse matrix.

A signal received by the receiver is expressed by Equation (3) below, which is determined using Equations (1) and (2) above.

$$y = \frac{\sqrt{p}}{\sqrt{\gamma}} u + \frac{\sqrt{p}}{\sqrt{\gamma}} \delta + n \qquad (3)$$

In Equation (3), p is a Tx power, γ is a normalization factor, u is a data vector, δ is an offset vector, and n is a noise vector.

Figure 2:
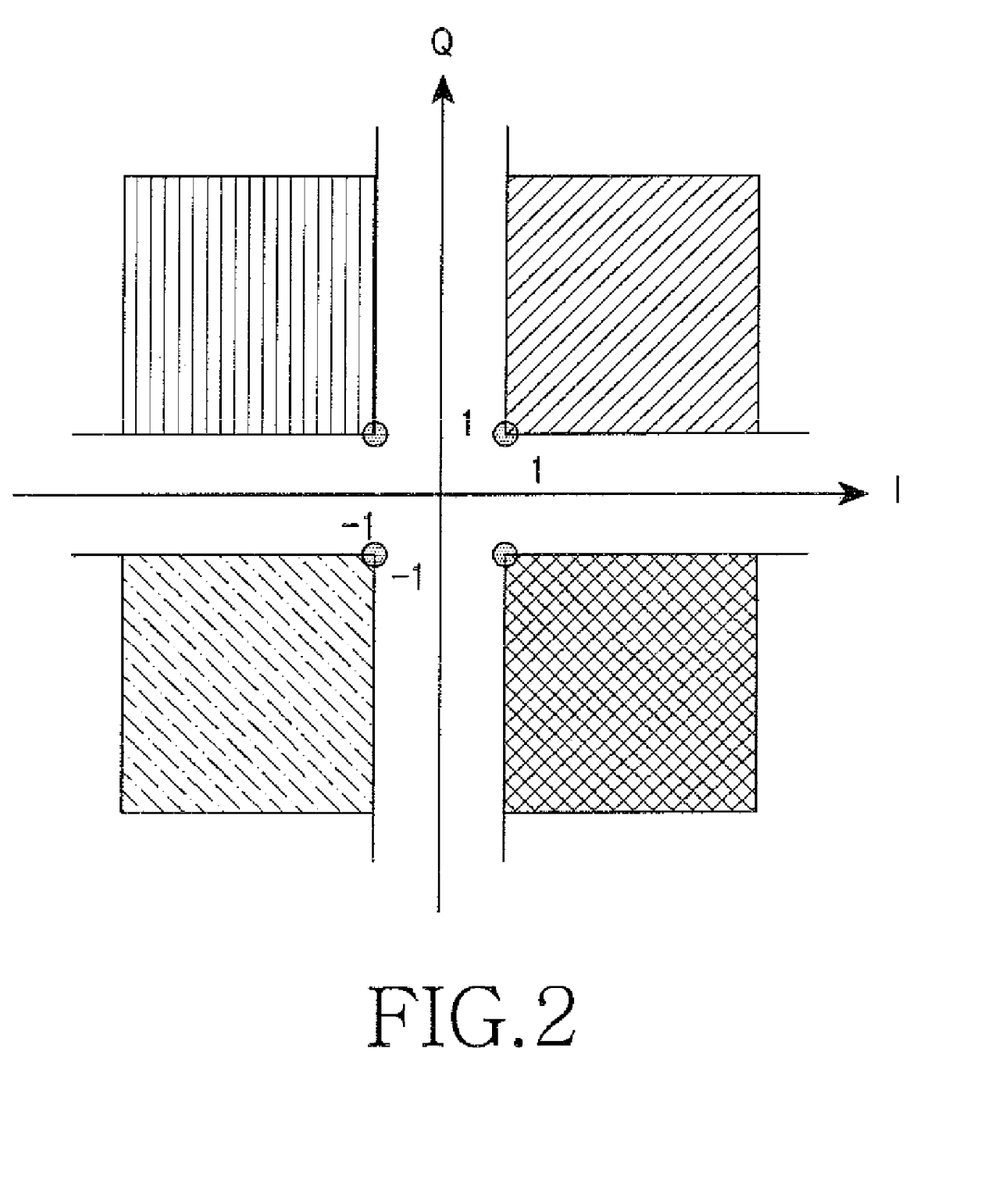
FIG. 2 illustrates a feasible region of an offset vector for supporting distortionless vector perturbation according to an exemplary embodiment of the present invention.

FIG. 2 illustrates a feasible region of an offset vector for supporting distortionless vector perturbation according to an exemplary embodiment of the present invention.

In the following example, Quadrature Phase Shift Keying (QPSK) will be described as a modulation scheme for each data signal. However, it is to be understood that this is for exemplary purpose only and conciseness of description. Thus, the present invention may also apply to other digital modulation schemes such as Quadrature Amplitude Modulation (QAM) and Phase Shift Keying (PSK).

If the offset vector is in the same direction as a data vector, then the offset vector will be no longer a distortion but an enhancement to the data vector. Referring to FIG. 2, the offset vector is generated by reallocating constellation points. Previous QPSK constellation points are located at corners of shadow regions. When the previous QPSK constellation points are reallocated to points inside the corresponding shadow regions, each of these region is a feasible region. Thus, a minimum Euclidean distance between a newly allocated constellation point and any constellation point located in other feasible regions is guaranteed not to be less than the minimum distance among the previous constellation points. When a constellation point is located in a relevant feasible region, it is said that the constellation point is feasible. By limiting the offset vector, perturbed data vectors are ensured to exist in the feasible region. Therefore, distortion caused by the offset vector can be reduced.

Figures 3A, 3B:
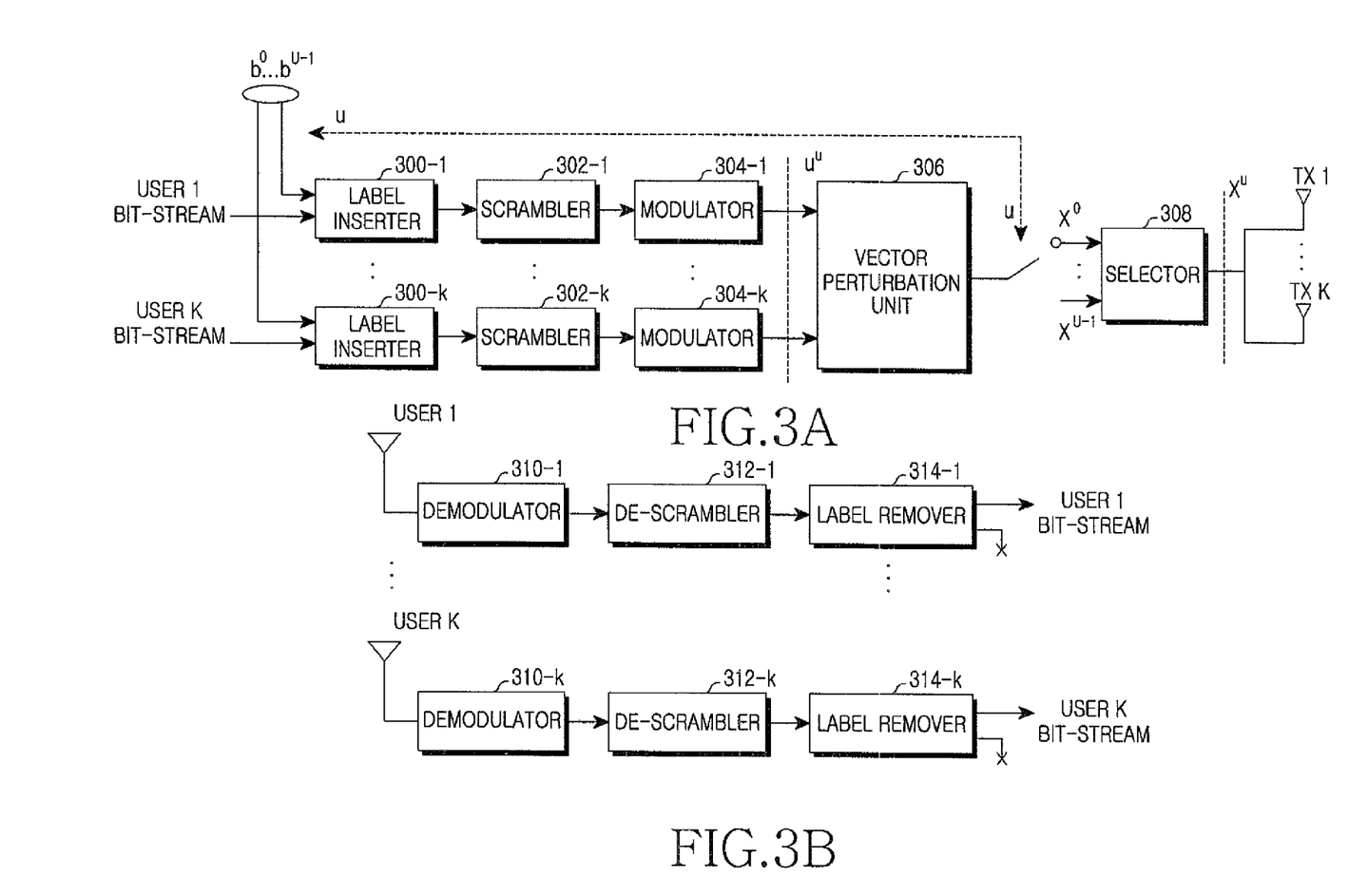
FIGS. 3A and 3B are block diagrams respectively illustrating a transmitter and a receiver for supporting distortionless vector perturbation according to an exemplary embodiment of the present invention.

FIGS. 3A and 3B are block diagrams respectively illustrating a transmitter and a receiver for supporting distortionless vector perturbation according to an exemplary embodiment of the present invention.

Referring to FIG. 3A, in a system supporting K users, the transmitter includes label inserters 300-1 to 300-K, scramblers 302-1 to 302-K, modulators 304-1 to 304-K, a vector perturbation unit 306, and a selector 308.

In each bit-stream received from a user, the respective label inserter 300 generates N labels for all bit-streams of each user and then inserts the labels into the bit-streams as a prefix. That is, the N labels are respectively inserted into the bit-streams, and then the resultant data is output to the respective scrambler 302.

The respective scrambler 302 scrambles the label-inserted bit-streams output from the label inserter 300, and randomly outputs N candidate sequences to the respective modulator 304. Herein, the labels are used to distinguish the N candidate sequences which are included for the same user and are output by scrambling.

The respective modulator 304 modulates the N scrambled candidate sequences, including the labels, according to a modulation scheme, and then outputs modulated symbols, which are mapped to corresponding constellation points, to the respective vector perturbation unit 306. For example, when a QPSK modulation scheme is used, 2-bit information is mapped to a corresponding constellation point among the four constellation points of FIG. 2.

The vector perturbation unit 306 adds a limited offset vector to the symbols modulated by the modulator 304, and outputs the resultant data to the selector 308. Herein, the offset vector has a continuous value and is used to reduce effective noise power. Further, by limiting the offset vector, distortion caused by the offset vector can be reduced. An optimal offset vector for minimizing the effective noise power can be obtained by solving a Quadratic Programming (QP) problem. The QP is developed one step further from a linear programming method which deals with an optimization issue. The linear programming method restricts both an objective function and a constraint in the form of a linear function. In comparison, the QP is a mathematical programming method which deals with an optimization issue when the objective function or the constraint is expressed in the form of a quadratic function.

The selector 308 calculates an average SNR for each N scrambled candidate sequence, selects one or more candidate sequences having a maximum SNR, and transmits the selected sequences to the receiver.

Referring to FIG. 3B, the receiver includes demodulators 310-1 to 310-K, de-scramblers 312-1 to 312-K, and label removers 314-1 to 314-K.

The respective demodulator 310 detects an Rx signal according to a Zero Forcing (ZF) scheme or Minimum Mean Squared Error (MMSE) detection scheme, demodulates the signal according to a demodulation scheme corresponding to the modulation scheme of the transmitter, and outputs the demodulated signal to the respective de-scrambler 312.

The de-scrambler 312 de-scrambles the demodulated signal output from the demodulator 310 by performing an inverse operation of the scrambler 302, and then outputs the resultant signal to the respective label remover 314.

The respective label remover 314 removes the labels from the sequences (i.e., label-inserted bit-streams) output from the de-scrambler 312, and thus outputs only a bit-stream portion.

Figure 4:
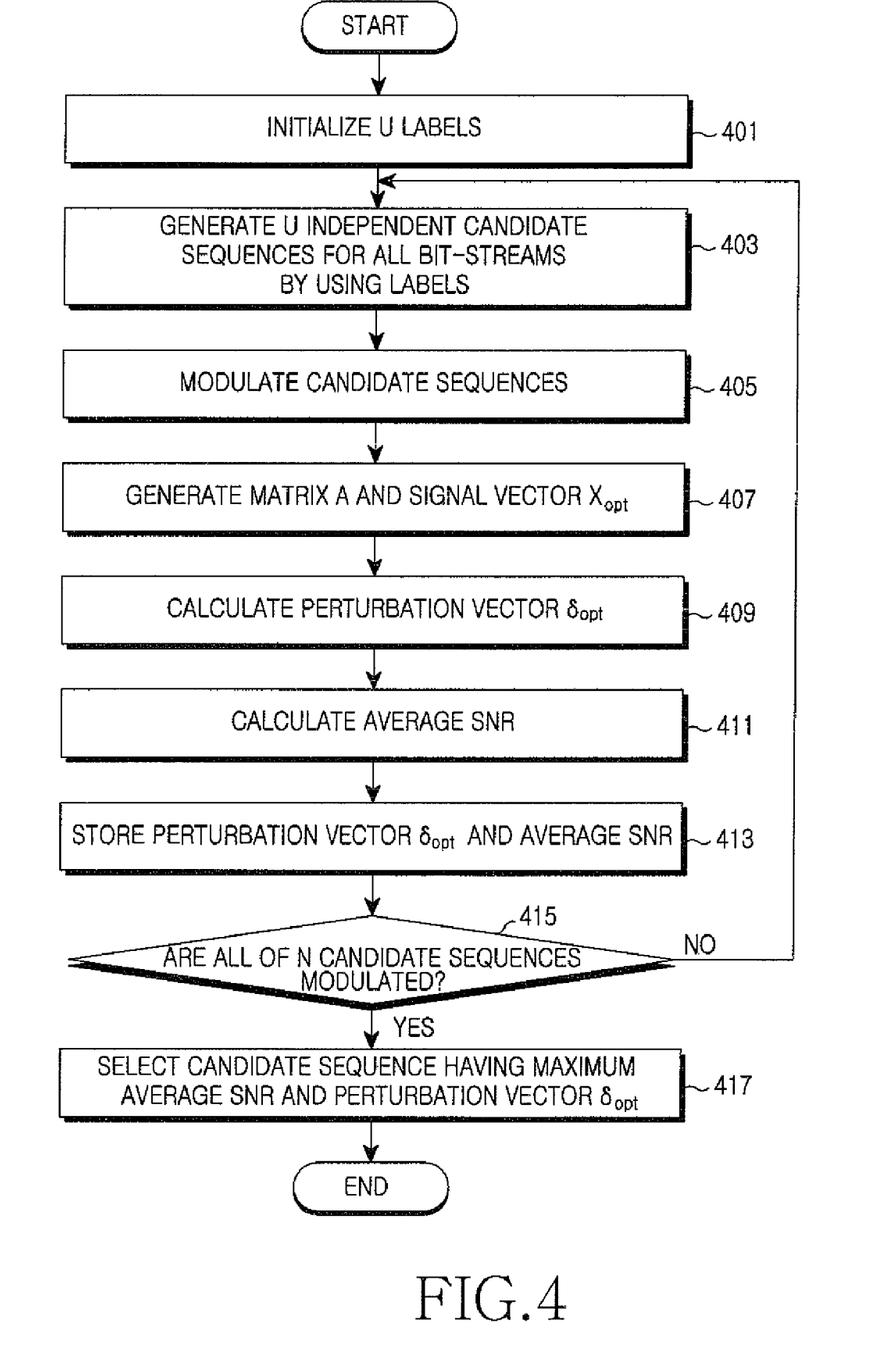
FIG. 4 is a flowchart illustrating an operation of a transmitter for supporting distortionless vector perturbation according to an exemplary embodiment of the present invention.

FIG. 4 is a flowchart illustrating an operation of a transmitter for supporting distortionless vector perturbation according to an exemplary embodiment of the present invention.

Referring to FIG. 4, N labels are generated for all bit-streams of each user, and are then inserted into the bit-streams as a prefix in step 401. That is, N labels are respectively inserted into the bit-streams, and thus N bit-streams are output for each user. Herein, although having the same information bit, the N bit-streams of each user are identified by the labels.

In step 403, bit-streams of one user are scrambled by using the labels to generate N independent candidate sequences. That is, the bit-streams of one user are output in the form of the N independent candidate sequences through scrambling. The N candidate sequences are identified by the labels.

In step 405, the N candidate sequences including the labels are modulated according to a modulation scheme by mapping to corresponding constellation points. For example, when a QPSK modulation scheme is used, two-bit information is mapped to a corresponding constellation point among the four constellation points of FIG. 2, and thus modulated symbols are output.

Thereafter, a limited offset vector is added according to a Vector Perturbation (VP) algorithm in steps 407 to 411. That is, in steps 407 to 411, constellation points are located in the feasible regions shown in FIG. 2.

Specifically, in step 407, a matrix A and a signal vector $x_{opt}$ are generated. The matrix A is a parameter for solving a QP problem, and the signal vector $x_{opt}$ is a vector with optimal vector perturbation. The matrix A is defined as Equation (4) below.

$$A = U^T \begin{bmatrix} M_r^T M_r + M_i^T M_i & M_i^T M_r - M_r^T M_i \\ M_r^T M_i - M_i^T M_r & M_r^T M_r + M_i^T M_i \end{bmatrix} U \quad (4)$$

In Equation (4), U is a diagonal matrix (i.e., $U = \text{diag}([u_r, u_i]^T)$) of a transpose matrix of a data vector $[u_r, u_i]$ represented by a rear part and an imaginary part, $[\bullet]^T$ is a transpose matrix, M is a variable defined as $Q^{\wedge-1/2} Q^H$ when a Singular Value Decomposition (SVD) of a matrix $HH^H$ is $Q^\wedge Q^H$.

The signal vector $x_{opt}$ is expressed by Equation (5) below.

$$\min x^T A x, \text{ s.t. } x \geq 1 \quad (5)$$

In Equation (5), x is an offset vector for minimizing noise, $x^T$ is a transpose matrix of x, and matrix A is a parameter for solving a QP problem.

In step 409, an offset vector $\delta_{opt}$ is calculated by using the signal vector $x_{opt}$ obtained by solving the QP problem. The offset vector $\delta_{opt}$ is calculated by using Equation (6) below.

$$\begin{bmatrix} \delta_r \\ \delta_i \end{bmatrix}_{opt} = U(x_{opt} - 1) \qquad (6)$$

In Equation (6), $\delta_{r_{opt}}$ is a real part of an optimal offset vector, $\delta_{i_{opt}}$ is an imaginary part of the optimal offset vector, U is a diagonal matrix (i.e., U=diag([$u_r$,$u_i$]$^T$)) of a transpose matrix of a data vector [$u_r$,$u_i$] represented by a real part and an imaginary part, $x_{opt}$ is a signal vector with optimal vector perturbation, and 1 is a unit matrix.

In step 411, an average SNR is calculated by using Equation (7) below.

$$SNR_{avg} = \frac{\frac{P}{\gamma} \|U \cdot x_{opt}\|^2}{\left\| \begin{bmatrix} n_r \\ n_i \end{bmatrix} \right\|^2} = \rho \frac{x_{opt}^T x_{opt}}{K x_{opt}^T A x_{opt}} \qquad (7)$$

In Equation (7), $x_{opt}$ is a signal vector with optimal vector perturbation, [•]$^T$ is a transpose matrix, matrix A is a parameter for solving a QP problem, ρ and K are constant values, U is a diagonal matrix (i.e., U=diag([$u_r$,$u_i$]$^T$)) of a transpose matrix of a data vector [$u_r$,$u_i$] represented by a rear part and an imaginary part, $$\begin{bmatrix} n_r \\ n_i \end{bmatrix}$$

is a noise vector, P is a Tx power, and γ is a normalization factor. The normalization factor γ is calculated by using Equation (8) below.

$$\gamma = \|M(u+\delta)\|^2 = \begin{bmatrix} c_r \\ c_i \end{bmatrix}^T A \begin{bmatrix} c_r \\ c_i \end{bmatrix} \qquad (8)$$

In Equation (8), M is a variable defined as $Q^{\wedge-1/2}Q^H$ when an SVD of a matrix $HH^H$ is $Q^{\wedge}Q^H$. Further, u is a data vector, δ is an offset vector, c is a vector obtained by adding the data vector and the offset vector, and the matrix A is a parameter for solving a QP problem.

In step 413, the perturbation vector $\delta_{opt}$ and the average SNR are stored.

In step 415, it is determined if all N candidate sequences have been modulated. If not, the process returns to step 403 and step 403 to step 413 are repeated for the N candidate sequences.

If it is determined in step 415 that all N candidate sequences have been modulated, a candidate sequence having a maximum SNR is selected from among the N candidate sequences in step 417.

Figure 5:
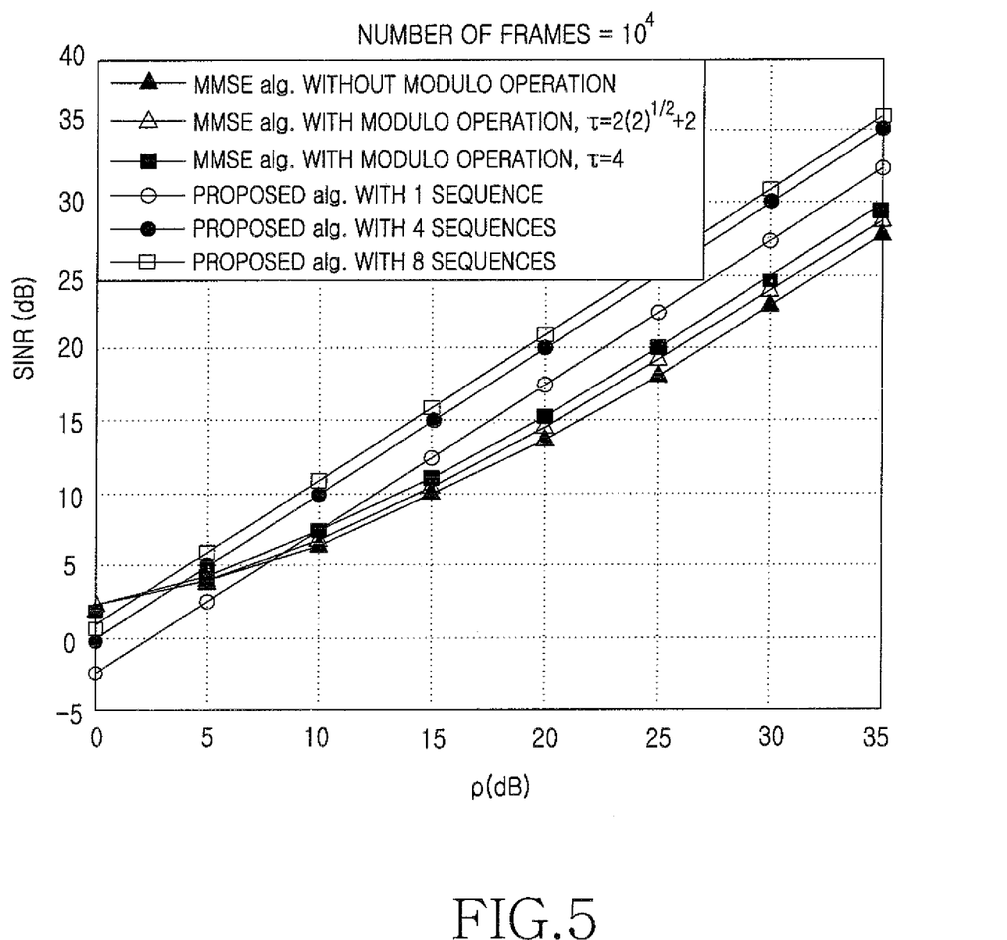
FIG. 5 is a graph illustrating a simulation result for comparing an exemplary embodiment of the present invention with a conventional method with respect to performance.

FIG. 5 is a graph illustrating a simulation result for comparing an exemplary embodiment of the present invention with a conventional method in regard to performance. The simulation has been performed under the condition that a pre-coded multi-user MIMO system has four Tx antennas and four users each using a single Rx antenna. A QPSK modulation scheme and a flat Rayleigh fading channel model have been applied to data of each user.

Referring to FIG. 5, the x-axis represents ρ, and the y-axis represents an SINR. When a vector perturbation algorithm of an exemplary embodiment of the present invention is compared with a conventional vector perturbation algorithm in terms of SINR, as shown in the graph, performance of a vector perturbation algorithm of an exemplary embodiment of the present invention has a better performance than the conventional vector perturbation algorithm. For example, when an input SNR is 20 dB, an output SINR is higher than the conventional vector perturbation algorithm by 5 dB. In addition, in exemplary embodiments of the present invention, a computational complexity for solving a QP problem is small in comparison with the conventional method.

According to exemplary embodiments of the present invention, a symbol having a maximum SNR is transmitted by generating a plurality of labels and candidate sequences for one input signal and then generating independent symbols by adding a limited offset vector. Therefore, distortion caused by a continuous offset vector can be reduced. Further, in combination with a SeLective Mapping (SLM) algorithm, a further improved performance is provided by outputting a high SINR.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A transmitter for supporting distortionless vector perturbation in a Multiple-Input Multiple-Output (MIMO) system, comprising:
    a label inserter for generating a label and for inserting the label into a user information bit;
    a scrambler for scrambling the user information bit inserted with the label and for generating N independent candidate sequences;
    a modulator for modulating the N independent candidate sequences according to a modulation scheme; and
    a vector perturbation unit for adding a limited offset vector so that the modulated symbols are mapped to a constellation point in a feasible region.

2. The transmitter of claim 1, further comprising a selector for selecting a candidate sequence having a maximum average Signal-to-Noise Ratio (SNR) from among the N independent candidate sequences.

3. The transmitter of claim 1, wherein the vector perturbation unit calculates a parameter for addressing a Quadratic Programming (QP) problem and a signal vector $x_{opt}$, with optimal vector perturbation to obtain an optimal offset vector $\delta_{opt}$, and adds the optimal offset vector $\delta_{opt}$ to a data vector.

4. The transmitter of claim 3, wherein the parameter for addressing the QP problem comprises a matrix A.

5. The transmitter of claim 4, wherein the matrix A is defined as Equation:

$$A = U^T \begin{bmatrix} M_r^T M_r + M_i^T M_i & M_i^T M_r - M_r^T M_i \\ M_r^T M_i - M_i^T M_r & M_r^T M_r + M_i^T M_i \end{bmatrix} U,$$

where U is a diagonal matrix (i.e., U=diag($[u_r,u_i]^T$)) of a transpose matrix of a data vector $[u_r,u_i]$ represented by a rear part and an imaginary part, $[\bullet]^T$ is a transpose matrix, M is a variable defined as $Q^{\hat{}-1/2}Q^H$ when a Singular Value Decomposition (SVD) of a matrix $HH^H$ is $Q\hat{}Q^H$, $M_i$ and $M_r$ are imaginary part and real part of M, respectively, Q is an orthogonal matrix, $\hat{}$ is a diagonal matrix with singular values, and $Q^H$ is a hermitian matrix of Q.

6. The transmitter of claim 4, wherein the signal vector $x_{opt}$ is obtained by using Equation:

min $x^T A x$, s.t. $x \geq 1$, where x is a data vector including an offset vector, $x^T$ is a transpose matrix of x, the matrix A is the parameter for solving the QP problem.

7. The transmitter of claim 3, wherein the offset vector $\delta_{opt}$ is obtained by using Equation:

$$\begin{bmatrix} \delta_r \\ \delta_i \end{bmatrix}_{opt} = U(x_{opt} - 1),$$

wherein $\delta_{r_{opt}}$ is a real part of an optimal offset vector, $\delta_{i_{opt}}$ is an imaginary part of the optimal offset vector, U is a diagonal matrix (i.e., U=diag($[u_r,u_i]^T$)) of a transpose matrix of a data vector $[u_r,u_i]$ represented by a rear part and an imaginary part, $x_{opt}$ is the signal vector with optimal vector perturbation, and 1 is a unit matrix.

8. The transmitter of claim 1, wherein the feasible region prevents distortion by minimizing effective noise power when a data bit is transmitted by mapping to the constellation point in transmission.

9. The transmitter of claim 1, wherein the vector perturbation unit obtains a parameter matrix A for solving a QP problem after limiting the offset vector, and then calculates an offset vector for minimizing noise by solving the QP problem.

10. A method of supporting distortionless vector perturbation in a Multiple-Input Multiple-Output (MIMO) system, the method comprising:
   generating a label;
   inserting the label into a user information bit;
   scrambling the user information bit inserted with the label;
   generating N independent candidate sequences;
   modulating the N independent candidate sequences according to a modulation scheme; and
   adding a limited offset vector so that the modulated symbols are mapped to a constellation point in a feasible region.

11. The method of claim 10, further comprising selecting a candidate sequence having a maximum average Signal-to-Noise Ratio (SNR) from among the N independent candidate sequences.

12. The method of claim 10, wherein the modulating of the N independent candidate sequences according to the modulation scheme comprises:
   calculating a parameter for addressing a Quadratic Programming (QP) problem;
   calculating a signal vector $x_{opt}$ with optimal vector perturbation;
   obtaining an optimal offset vector $\delta_{opt}$; and
   adding the optimal offset vector to a data vector.

13. The method of claim 12, wherein the calculating of the parameter for addressing the QP problem comprises calculating a matrix A.

14. The method of claim 13, wherein the matrix A is defined as Equation:

$$A = U^T \begin{bmatrix} M_r^T M_r + M_i^T M_i & M_i^T M_r - M_r^T M_i \\ M_r^T M_i - M_i^T M_r & M_r^T M_r + M_i^T M_i \end{bmatrix} U,$$

where U is a diagonal matrix (i.e., U=diag($[u_r,u_i]^T$)) of a transpose matrix of a data vector $[u_r,u_i]$ represented by a rear part and an imaginary part, $[\bullet]^T$ is a transpose matrix, M is a variable defined as $Q^{\hat{}-1/2}Q^H$ when a Singular Value Decomposition (SVD) of a matrix $HH^H$ is $Q\hat{}Q^H$, $M_i$ and $M_r$ are imaginary part and real part of M, respectively, Q is an orthogonal matrix, $\hat{}$ is a diagonal matrix with singular values, and $Q^H$ is a hermitian matrix of Q.

15. The method of claim 13, wherein the signal vector $x_{opt}$ is calculated by using Equation:

min $x^T A x$, s.t. $x \geq 1$, where x is a data vector including an offset vector, $x^T$ is a transpose matrix of x, the matrix A is the parameter for solving the QP problem.

16. The method of claim 12, wherein the offset vector $\delta_{opt}$ is obtained by using Equation:

$$\begin{bmatrix} \delta_r \\ \delta_i \end{bmatrix}_{opt} = U(x_{opt} - 1),$$

wherein $\delta_{r_{opt}}$ is a real part of an optimal offset vector, $\delta_{i_{opt}}$ is an imaginary part of the optimal offset vector, U is a diagonal matrix U=diag($[u_r,u_i]^T$) of a transpose matrix of a data vector $[u_r,u_i]$ represented by a rear part and an imaginary part, $x_{opt}$ is the signal vector with optimal vector perturbation, and 1 is a unit matrix.

17. The method of claim 10, wherein the feasible region prevents distortion by minimizing effective noise power when a data bit is transmitted by mapping to the constellation point in transmission.

18. The method of claim 10, further comprising:
   obtaining a parameter matrix A for solving a QP problem after limiting the offset vector; and
   calculating an offset vector for minimizing noise by solving the QP problem.

* * * * *